(12) United States Patent
Miyazaki

(10) Patent No.: US 12,434,391 B2
(45) Date of Patent: Oct. 7, 2025

(54) PRODUCTION SYSTEM

(71) Applicant: FANUC CORPORATION, Yamanashi (JP)

(72) Inventor: Wataru Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 118 days.

(21) Appl. No.: 18/553,734

(22) PCT Filed: Jun. 8, 2021

(86) PCT No.: PCT/JP2021/021803
§ 371 (c)(1),
(2) Date: Oct. 3, 2023

(87) PCT Pub. No.: WO2022/259387
PCT Pub. Date: Dec. 15, 2022

(65) Prior Publication Data
US 2024/0181653 A1 Jun. 6, 2024

(51) Int. Cl.
*G06F 17/00* (2019.01)
*B25J 5/02* (2006.01)
(Continued)

(52) U.S. Cl.
CPC ............... *B25J 13/088* (2013.01); *B25J 5/02* (2013.01); *B25J 9/0093* (2013.01)

(58) Field of Classification Search
CPC . B25J 13/088; B25J 5/02; B25J 9/0093; B25J 9/1697; G05B 2219/39102; G05B 19/4182
(Continued)

(56) References Cited

U.S. PATENT DOCUMENTS 7,395,606 B2 * 7/2008 Crampton .............. G01B 5/008
33/503
7,591,078 B2 * 9/2009 Crampton .............. B25J 13/088
33/503
(Continued)

FOREIGN PATENT DOCUMENTS

JP S60-029486 U 2/1985
JP S61-111893 A 5/1986
(Continued)

OTHER PUBLICATIONS

Bimanual dynamic grabbing and tossing of objects onto a moving target (Year: 2023).*

*Primary Examiner* — Ronnie M Mancho
(74) *Attorney, Agent, or Firm* — HAUPTMAN HAM, LLP

(57) ABSTRACT

A production system includes a conveyance device, a robot, a movement device, a sensor acquiring position information regarding an article conveyed by the conveyance device, a calculation unit calculating a velocity vector for the article conveyed by the conveyance device based on the position information acquired by the sensor, and a control unit that, when the direction of movement of the article conveyed by the conveyance device and the direction of movement of the robot moved by the movement device differ, controls a velocity vector for the robot moved by the movement device and a velocity vector for the position of an end effector of the robot so that the sum of the velocity vector for the robot moved by the movement device and the velocity vector for the position of the end effector of the robot matches the velocity vector of the article conveyed by the conveyance device.

5 Claims, 3 Drawing Sheets

(51) Int. Cl.
  *B25J 9/00*   (2006.01)
  *B25J 13/08*  (2006.01)
(58) Field of Classification Search
  USPC .......................................................... 700/245
  See application file for complete search history.

(56) References Cited

U.S. PATENT DOCUMENTS

| | | | | |
|---|---|---|---|---|
| 9,333,654 | B2* | 5/2016 | Chen | B25J 9/1697 |
| 9,707,682 | B1* | 7/2017 | Konolige | G06T 17/00 |
| 10,955,828 | B2* | 3/2021 | Lager | B25J 9/0093 |
| 11,542,103 | B1* | 1/2023 | Paulson | B65G 47/905 |
| 12,008,768 | B2* | 6/2024 | Olmstead | G06V 10/751 |
| 2011/0087360 | A1* | 4/2011 | Chen | B25J 9/1697 |
| | | | | 700/114 |
| 2011/0150610 | A1 | 6/2011 | Weber | |
| 2019/0184559 | A1* | 6/2019 | Lager | B25J 9/1669 |
| 2021/0268659 | A1* | 9/2021 | Olmstead | B25J 9/1697 |
| 2022/0292234 | A1* | 9/2022 | Iwamura | B25J 9/1671 |

FOREIGN PATENT DOCUMENTS

| | | |
|---|---|---|
| JP | S63-077678 A | 4/1988 |
| JP | S64-067605 A | 3/1989 |
| JP | H01-183388 A | 7/1989 |
| JP | H01-187602 A | 7/1989 |
| JP | H02-202606 A | 8/1990 |
| JP | H07-060327 B2 | 6/1995 |
| JP | H08-072764 A | 3/1996 |
| JP | 2009-028818 A | 2/2009 |
| JP | 2019-038073 A | 3/2019 |
| JP | 2019-072792 A | 5/2019 |
| JP | 2019093481 A | 6/2019 |
| JP | 2019-155521 A | 9/2019 |
| JP | 2019-155522 A | 9/2019 |

* cited by examiner

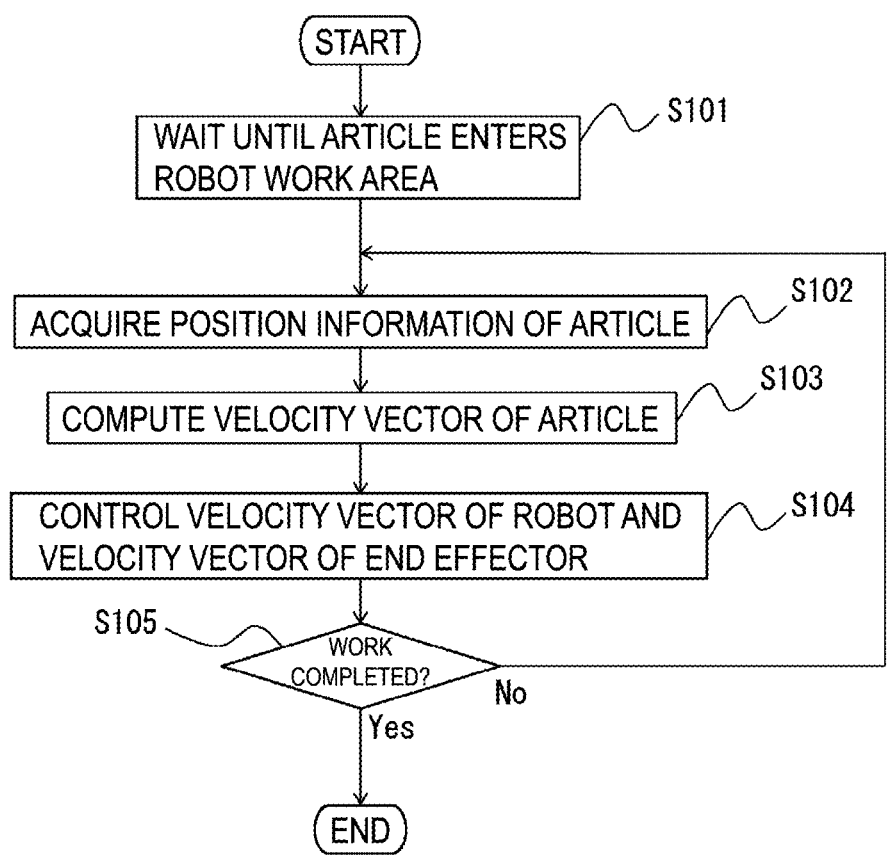

PRODUCTION SYSTEM

RELATED APPLICATIONS

The present application is National Phase of International Application No. PCT/JP2021/021803 filed Jun. 8, 2021.

TECHNICAL FIELD

The present invention relates to a production system.

BACKGROUND ART

There is known a production system in which a robot performs a work on an article conveyed by a conveyance device. The production system includes the conveyance device that conveys an article, the robot that performs a work on the article conveyed by the conveyance device, and a movement device that moves the robot. In the production system, it is important to maintain a positional relationship whereby the robot can appropriately perform a work on the article.

For example, in a tracking control method for causing a robot with a traveling axis, which includes a robot body and a traveling axis for causing the robot body to travel in a predetermined direction, to track a continuous line, there is known a tracking control method of a robot with a traveling axis in which a travel speed of the line is divided into unit times to calculate an average speed per unit time, the traveling axis of the robot with a traveling axis is controlled to perform tracking travel at the average speed per unit time, and a resulting tracking error between the traveling axis and the line is corrected as a robot error in a direction of the traveling axis by controlling joint axes of the robot body (for example, see PTL 1).

For example, there is known a work system including a conveyance device that conveys an article: a movement platform that can move; a work unit that is fixed to the movement platform and performs a work on the article conveyed by the conveyance device; a vision sensor that is fixed to the movement platform and sequentially acquire visual information of the article conveyed by the conveyance device or a mark formed on the conveyance device; a detecting unit that sequentially detects at least a position of the article or the mark by processing the visual information acquired by the vision sensor; a computation unit that computes a conveyance speed of the conveyance device, based on the position of the article or the mark sequentially detected by the detecting unit; and a drive control unit that drives the work unit using the conveyance speed (for example, see PTL 2).

For example, in a production line controller including a workpiece conveying means of conveying a workpiece: a robot that performs a predetermined work on the workpiece conveyed by the workpiece conveying means; and a robot movement driving means that can move the robot along a workpiece conveyance path. there is known a production line controller including a workpiece position detecting means of detecting a position in a conveyance direction of the workpiece conveyed by the workpiece conveying means: a robot position detecting means of detecting a position of the robot moved and driven in the conveyance direction of the workpiece by the robot movement driving means: a robot control means of controlling the robot: a synchronous control means of controlling the robot movement driving means such that the robot moves to synchronously track the workpiece being conveyed; and a coordination control means of coordinating control by the robot control means and control by the synchronous control means using the position of the workpiece detected by the workpiece position detecting means and the position of the robot detected by the robot position detecting means (for example, see PTL 3).

CITATION LIST

Patent Literature

[PTL 1] JP 07-060327 B
[PTL 2] JP 2019-072792 A
[PTL 3] JP 08-072764 A

SUMMARY OF INVENTION

Technical Problem

In a production system, when the movement direction of an article conveyed by a conveyance device is the same as the movement direction of a robot moved by a movement device, the conveyance speed of the conveyance device is calculated using a device such as an encoder, and the robot is caused to move, by the movement device, at the same speed as the conveyance speed of the conveyance device conveying the article so as to cause the robot to track the article, whereby a positional relationship in which the robot can appropriately perform a work on the article can be maintained. However, the movement direction of the article conveyed by the conveyance device may be different from the movement direction of the robot moved by the movement device. For example, due to various factors such as operation accuracy and vibration of the conveyance device and/or the movement device, the movement direction of the article and/or the movement direction of the robot may deviate from an ideal direction, and a relative distance between the robot and the article may be changed. Furthermore, for example, the movement direction of the article conveyed by the conveyance device may be a curved line instead of a straight line, or the article may be conveyed by the conveyance device in a direction inclined relative to a horizontal plane. When the movement direction of the article conveyed by the conveyance device is different from the movement direction of the robot moved by the movement device as described above, it is not possible to cause the robot to track the article by control using only the value of the conveyance speed of the article by the conveyance device measured by the encoder. Thus, there is demand for the development of a production system that can maintain a positional relationship in which a robot can appropriately perform a work on an article even when the movement direction of the article conveyed by a conveyance device is different from the movement direction of a robot moved by a movement device.

Solution to Problem

According to an aspect of the present disclosure, a production system including a conveyance device that conveys an article, a robot that performs a work on the article conveyed by the conveyance device, and a movement device that moves the robot includes a sensor that acquires position information of the article conveyed by the conveyance device: a calculation unit that computes a velocity vector of the article conveyed by the conveyance device based on the position information acquired by the sensor; and a control unit that controls, when a movement direction of the article conveyed by the conveyance device is different from a movement direction of the robot moved by the movement device, a velocity vector of the robot moved by the movement device and a velocity vector of a position of an end effector of the robot so as to make a sum of the velocity vector of the robot moved by the movement device and the velocity vector of the position of the end effector of the robot match the velocity vector of the article conveyed by the conveyance device.

Advantageous Effect of Invention

According to an aspect of the present disclosure, the production system that can maintain a positional relationship in which the robot can appropriately perform a work on the article even when the movement direction of the article conveyed by the conveyance device is different from the movement direction of the robot moved by the movement device.

BRIEF DESCRIPTION OF DRAWINGS

FIG. 3 is a flowchart illustrating an operation flow of a production system according to an embodiment of the present disclosure.

DESCRIPTION OF EMBODIMENTS

Figure 1:
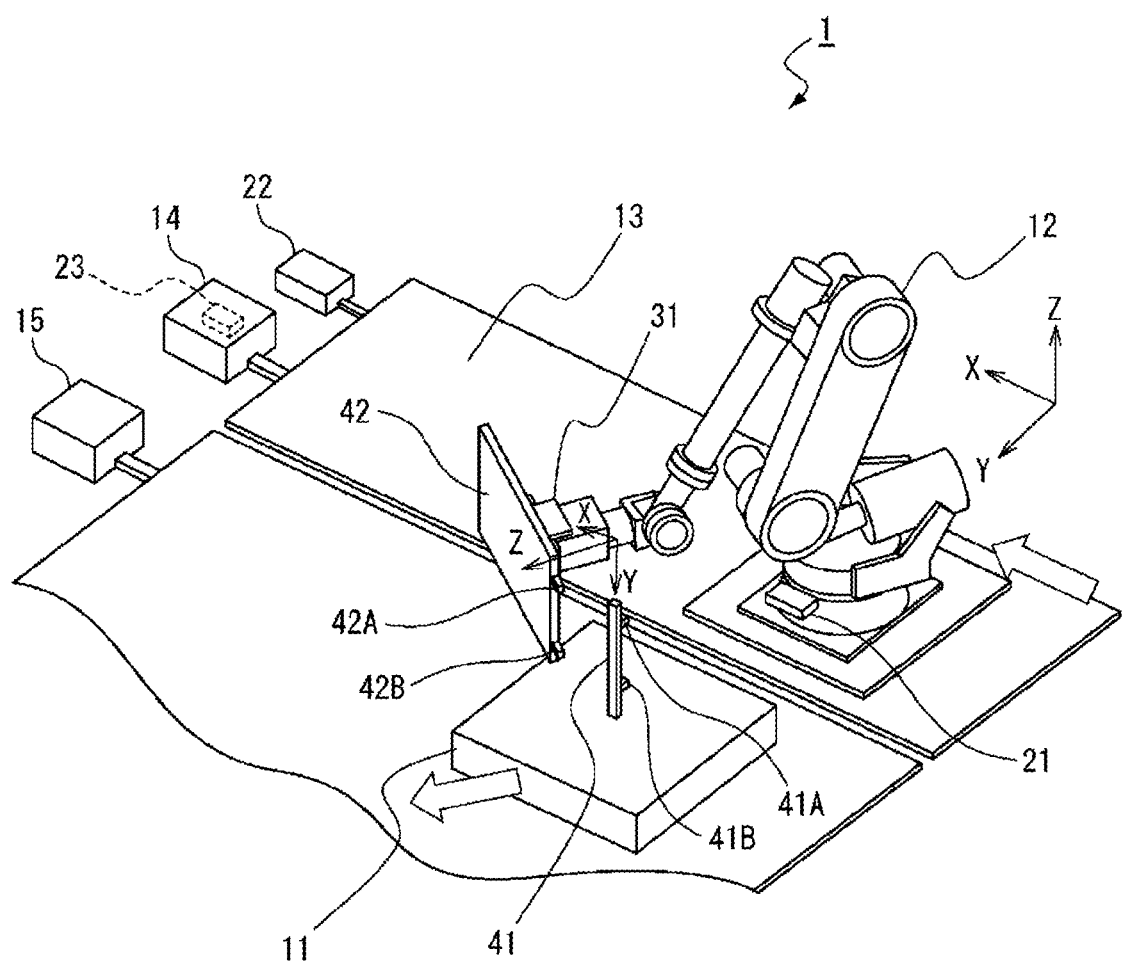
FIG. 1 is a perspective view illustrating an example of a production system according to an embodiment of the present disclosure.

A production system will be described below with reference to the drawings. The drawings are appropriately scaled for ease of understanding. The form illustrated in the drawing is an example for implementation, and the present disclosure is not limited to the embodiment illustrated. In the following description, "velocity" is a vector quantity representing an amount of displacement of an object per unit time and a direction of the displacement. In the present specification, "speed" is described as "velocity vector" in order to clarify that "speed" refers to a vector quantity. In addition, "speed" is a scalar quantity representing a magnitude of velocity.

FIG. 1 is a perspective view illustrating an example of a production system according to an embodiment of the present disclosure.

A production system 1 includes a conveyance device 11 that conveys an article 41, a robot 12 that performs a work on the article 41 conveyed by the conveyance device 11, and a movement device 13 that moves the robot 12. Here, as an example, the production system 1 in which the robot 12 performs a work of assembling a component 42 to the article 41 conveyed by the conveyance device 11 will be described.

A reference coordinate system (world coordinate system) that is immovable in response to changes in the position and the orientation of the robot 12 is set to the production system 1. In the reference coordinate system, the position of the origin is fixed, and further, the directions of coordinate axes are fixed. The reference coordinate system has an X-axis, a Y-axis, and a Z-axis which are orthogonal to each other as the coordinate axes. In addition, the W-axis is set as a coordinate axis around the X-axis. A P-axis is set as a coordinate axis around the Y-axis. An R-axis is set as a coordinate axis around the Z-axis.

In the production system 1, a tool coordinate system having an origin set at any position of an end effector (work tool) 31 of the robot 12 is set. The position and the orientation of the tool coordinate system change together with the end effector 31. The origin of the tool coordinate system is set at a tool tip point of the end effector 31. The position of the end effector 31 of the robot 12 corresponds to the position of the tool tip point in the reference coordinate system (the position of the origin of the tool coordinate system). Further, the orientation of the end effector 31 of the robot 12 corresponds to the orientation of the tool coordinate system relative to the reference coordinate system.

As the conveyance device 11 that conveys the article 41, a conveyance device of any form can be employed. The conveyance direction (movement direction) of the article 41 by the conveyance device 11 is any direction in the X-axis direction and the Y-axis direction on a horizontal plane and any direction in the Y-axis direction perpendicular to a horizontal plane. In FIG. 1, as an example, an automated guided vehicle (AGV) is employed as the conveyance device 11. For example, the AGV as the conveyance device 11 may move in any direction in the X-axis direction and/or the Y-axis direction on a horizontal plane. In addition, the AGV as the conveyance device 11 may move on a slope having any inclination angle relative to a horizontal plane. In that case, the movement direction of the AGV is the X-axis direction, the Y-axis direction, and/or the Z-axis direction. It should be noted that the conveyance device 11 is not limited to the AGV illustrated here, but may be, for example, a belt conveyor, a conveyance device with a traveling axis that travels on a traveling guide rail, a magnetic suspension conveyance device, an electromagnetic suspension conveyance device, or the like.

As the movement device 13 that moves (the main body of) the robot 12, a movement device of any form can be employed. The movement device 13 causes the robot 12 to reciprocate in one direction on a horizontal plane. In FIG. 1, as an example, the movement device 13 causes the main body of the robot 12 to reciprocate in a plus (+) direction and a minus (−) direction of the X-axis direction. For example, the movement device 13 is a movement device with a traveling axis in which a support base supporting the robot 12 travels on a traveling guide rail using a motor (not illustrated) as a drive source. It should be noted that the movement device 13 is not limited to this form, and any movement device that causes the robot 12 to reciprocate in one direction on a horizontal plane can be employed. For example, as the movement device 13, a belt conveyor, an AGV, a magnetic suspension conveyance device, an electromagnetic suspension conveyance device, or the like can be employed.

The robot 12 performs any work on the article 41 being conveyed by the conveyance device 11. The end effector 31 attached to the robot 12 is any work tool appropriate for a work performed by the robot 12. In FIG. 1, as an example, the end effector 31 is a hand that holds and releases the component 42. The hand is a suction hand that holds a surface of the component 42 by sucking. It should be noted that the end effector 31 attached to the robot 12 is not limited to this form, and a work tool for performing welding is employed in a production system that performs a welding work, and a work tool for applying paint to a surface of an article is employed in a production system that performs a painting work.

In the example illustrated in FIG. 1, the robot 12 assembles the component 42 to the article 41 by fitting a fitting portions 42A and 42B of the component 42 held by the hand, which is the end effector 31, to fitting portions and 41B of the article 41, respectively. For example, the article 41 is a body of an automobile, and the component 42 is a door or a tire of the automobile.

In order to cause the end effector 31 of the robot 12 to track the movement of the article conveyed by the conveyance device 11, the production system 1 according to an embodiment of the present disclosure includes a sensor 21, a calculation unit 22, and a control unit 23.

The sensor 21 acquires position information of the article 41 conveyed by the conveyance device 11. The sensor 21 may be any sensor that can acquire the positional relationship between the article 41 and the robot 12. In the illustrated example, the sensor 21 is disposed on the main body of the robot 12 at a position where the sensor 21 can sense the article 41. As an alternative example, the sensor 21 may be disposed above the robot 12 and the article 41 (for example, at a ceiling of a room in which the production system 1 is installed) so that both the robot 12 and the article 41 can be sensed.

Examples of a method of acquiring the position information of the article 41 by the sensor 21 include a stereo camera method and a pulse radar method.

In the stereo camera method, the sensor 21 includes two two-dimensional cameras that images two-dimensional images, and an arithmetic processing device that acquires position information of the article 41 by image processing based on parallax between two images imaged by the two two-dimensional cameras. As the two-dimensional cameras, any cameras including an image sensor such as a charge-coupled device (CCD) sensor or a complementary metal-oxide semiconductor (CMOS) sensor can be employed. In addition, the sensor 21 may include a projector that projects pattern light such as a stripe pattern toward the article 41, may image a projected pattern on the article 41 by the two-dimensional cameras, and may acquire the position information of the article 41 based on an imaging result.

In the pulse radar method, the sensor 21 includes a transmitter that transmits radio waves, a receiver that receives reflected waves from the article 41, and an arithmetic processing device that acquires the position information of the article 41 based on a relationship between the radio waves transmitted by the transmitter and the reflected waves received by the receiver.

When the conveyance device 11 includes a conveyance device (for example, an AGV or the like) including a support base that moves together with the article 41, the position information of the article 41 corresponds to the position information of the support base included in the conveyance device 11 on a one-to-one basis. Thus, in this case, the sensor 21 may acquire the position information of the support base included in the conveyance device 11 and then acquire the position information of the article 41 based on the position information of the support base.

The position information of the article 41 conveyed by the conveyance device 11 is periodically (for example, in a cycle of several hundred milliseconds) acquired by the sensor 21 and transmitted to the calculation unit 22.

The calculation unit 22 computes a velocity vector of the article 41 conveyed by the conveyance device 11 based on the position information periodically acquired by the sensor 21. The velocity vector of the article 41 includes a "speed" representing a displacement amount per unit time of the article 41 and a "movement direction" of the article 41 moving at the speed.

The calculation unit 22 includes an arithmetic processing device (processor). Examples of the arithmetic processing device include an IC, an LSI, a CPU, an MPU, a DSP. The calculation unit 22 including the arithmetic processing device is, for example, a functional module implemented by a computer program executed in the processor. For example, when the calculation unit 22 is implemented in the form of a computer program, the function of the calculation unit 22 can be achieved by operating the arithmetic processing device in accordance with the computer program. The computer program for executing the processing of the calculation unit 22 may be provided in the form of being recorded on a computer-readable recording medium such as a semiconductor memory, a magnetic recording medium, or an optical recording medium. Alternatively, the calculation unit 22 may be achieved as a personal computer including a semiconductor integrated circuit in which a computer program for achieving the function is written.

The production system 1 is also provided with a first controller 14 and a second controller 15.

The second controller 15 has a function of controlling the operation of the conveyance device 11. That is, the second controller 15 controls a velocity vector related to the conveyance device 11 in accordance with a predetermined operation program. Since a velocity vector includes a "speed" representing a displacement amount per unit time of an object and a "movement direction" of the object moving at the speed, the control of the velocity vector includes "speed control" and "direction control". For example, when the conveyance device 11 includes an AGV, a magnetic suspension conveyance device, or an electromagnetic suspension conveyance device, the second controller 15 controls the speed and the direction of the movement of the article 41 by the conveyance device 11. When the conveyance device 11 includes a belt conveyor or a conveyance device with a traveling axis that travels on a traveling guide rail, the movement direction of the article 41 by the conveyance device 11 is determined in advance, and thus the second controller 15 controls the conveyance speed of the article 41 by the conveyance device 11.

The first controller 14 has a function of controlling a work by the robot 12 and a function of controlling the operation of the movement device 13. In the first controller 14, in addition to a control unit (not illustrated) for controlling the operation of the end effector 31 necessary for a work on the article 41, a control unit 23 for controlling the movement of the robot 12 by the movement device 13 and the movement of the position of the end effector 31 of the robot 12 is also provided. The control unit 23 controls the velocity vector of (the main body of) the robot 12 and the velocity vector of the position of the end effector 31 of the robot 12 in response to the velocity vector of the article 41 computed by the calculation unit 22. More specifically, the control unit 23 controls the velocity vector of the robot 12 moved by the movement device 13 and the velocity vector of the position of the end effector 31 of the robot 12 so as to make the sum of the velocity vector of the robot 12 moved by the movement device 13 and the velocity vector of the position of the end effector 31 of the robot 12 match the velocity vector of the article 41 conveyed by the conveyance device 11. Since a velocity vector includes a "speed" representing a displacement amount per unit time of an object and a "movement direction" of the object moving at the speed, the control of the velocity vector includes "speed control" and "direction control". Details of the processing of controlling the movement and the movement of the position of the end effector 31 of the robot 12 by the control unit 23 will be described below.

An arithmetic processing device (processor) is provided in the first controller 14 and the second controller 15. Examples of the arithmetic processing device include an IC, an LSI, a CPU, an MPU, a DSP. The control unit 23 including the arithmetic processing device in the first controller 14 is, for example, a functional module implemented by a computer program executed in the processor. For example, when the control unit 23 is implemented in the form of a computer program, the function of the control unit 23 can be achieved by operating the arithmetic processing device in accordance with the computer program. The computer program for executing the processing of the control unit 23 may be provided in the form of being recorded on a computer-readable recording medium such as a semiconductor memory, a magnetic recording medium, or an optical recording medium. Alternatively, the control unit 23 may be achieved as a semiconductor integrated circuit in which a computer program for achieving the function is written.

The first controller 14 and the second controller 15 may be configured as an integrated controller, and the integrated controller may include the calculation unit 22. Alternatively, the calculation unit 22 may be included in the first controller 14 or the second controller 15.

Subsequently, details of the processing of controlling the movement and the movement of the position of the end effector 31 of the robot 12 by the control unit 23 will be described.

Figure 2:
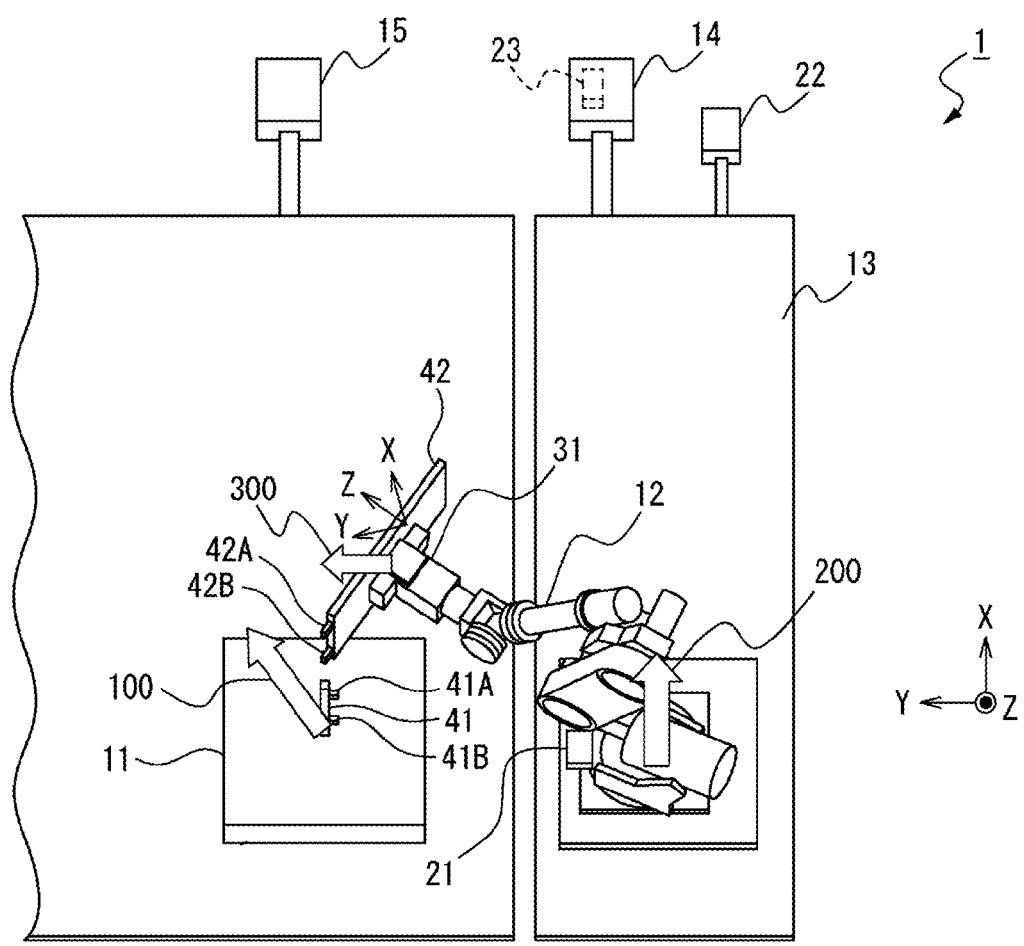
FIG. 2 is a diagram illustrating a relationship among a velocity vector of an article conveyed by a conveyance device, a velocity vector of a robot, and a velocity vector of a position of an end effector of the robot in a production system according to an embodiment of the present disclosure.

FIG. 2 is a diagram illustrating a relationship among a velocity vector of an article conveyed by a conveyance device, a velocity vector of a robot, and a velocity vector of a position of an end effector of the robot in a production system according to an embodiment of the present disclosure. In FIG. 2, the velocity vector of the article 41 computed by the calculation unit 22 is denoted by reference sign 100. The velocity vector of (the main body of) the robot 12 controlled by the control unit 23 is denoted by reference sign 200, and the velocity vector of the position of the end effector 31 of the robot 12 controlled by the control unit 23 is denoted by reference sign 300.

The main body of the robot 12 reciprocates in the plus (+) direction and the minus (−) direction of the X-axis direction by the operation of the movement device 13.

On the other hand, depending on the configuration of the production system 1, the article 41 conveyed by the conveyance device 11 may move in a direction away from or approaching the main body of the robot 12 (the Y-axis direction and/or the Z-axis direction) instead of being kept parallel to the movement direction of the main body of the robot 12. There is also the production system 1 having a configuration in which the movement direction of the article 41 conveyed by the conveyance device 11 is not a straight line but a curved line, or the article 41 is conveyed by the conveyance device 11 in a direction inclined relative to a horizontal plane. Furthermore, depending on the configuration of the production system 1, even if the production system 1 is designed so that the movement direction of the article 41 conveyed by the conveyance device 11 is parallel to the movement direction of the main body of the robot 12, the movement direction of the article 41 and/or the movement direction of (the main body of) the robot 12 may deviate from an original direction due to various factors such as the operation accuracy and vibration of the conveyance device 11 and/or the movement device 13, and the relative distance between (the main body of) the robot 12 and the article 41 may change.

As described above, in the production system 1, a situation occurs in which the movement direction of the article 41 conveyed by the conveyance device 11 is different from the movement direction of (the main body of) the robot 12 moved by the movement device 13. Thus, in an embodiment of the present disclosure, the control unit 23 controls the velocity vector 200 of the robot 12 and the velocity vector 300 of the end effector 31 of the robot 12 in response to the velocity vector 100 of the article 41 computed by the calculation unit 22. More specifically, when the movement direction of the article 41 conveyed by the conveyance device 11 is different from the movement direction of (the main body of) the robot 12 moved by the movement device 13, the control unit 23 controls the velocity vector of (the main body of) the robot 12 moved by the movement device 13 and the velocity vector of the position of the end effector 31 of the robot 12 so as to make the sum of the velocity vector 200 of (the main body of) the robot 12 moved by the movement device 13 and the velocity vector 300 of the position of the end effector 31 of the robot 12 match the velocity vector of the article 41 conveyed by the conveyance device 11. Accordingly, even when the movement direction of the article 41 conveyed by the conveyance device 11 is different from the movement direction of (the main body of) the robot 12 moved by the movement device 13 in the production system 1, a positional relationship in which the robot 12 can 30) appropriately perform a work on the article can be maintained.

Since the movement device 13 only needs to reciprocate the main body of the robot 12 in the plus (+) direction and the minus (−) direction of the X-axis direction, the velocity vector of the robot 12 to be controlled by the control unit 23 ideally has only an X-axis direction component. However, actually, the main body of the robot 12 controlled by the control unit 23 slightly fluctuates in the Y-axis direction and/or the Z-axis direction due to the influence of the operation accuracy, the vibration, and the like of the movement device 13. Since the position information of the article 41 acquired by the sensor 21 indicates the position of the article 41 relative to the main body of the robot 12, the velocity vector of the article 41 computed by the calculation unit 22 based on the position information of the article 41 also includes a Y-axis direction component and/or a Z-axis direction component attributable to the operation accuracy and the vibration of the movement device 13. Thus, the control unit 23 controls the velocity vector 200 of the robot 12 and the velocity vector 300 of the end effector 31 of the robot 12 in response to the velocity vector 100 of the article 41 computed by the calculation unit 22, whereby it is possible to cope with fluctuations in the Y-axis direction and/or the Z-axis direction of the main body of the robot 12 attributable to the influence of the operation accuracy, the vibration, and the like of the movement device 13.

The velocity vector of the article 41 conveyed by the conveyance device 11 can also be grasped from the design data or the control data of the production system 1. However, as described above, it is highly likely that the "actual" velocity vector of the article 41 deviates from the "ideal" velocity vector of the article 41 grasped from the design content of the production system 1 due to various factors such as the operation accuracy, the vibration, and the like of the conveyance device 11 and/or the movement device 13. In an embodiment of the present disclosure, the velocity vector 200 of the robot 12 and the velocity vector 300 of the end effector 31 of the robot 12 are controlled in response to the velocity vector of the article 41 computed based on the position information of the article 41 acquired by the sensor 21, i.e., in response to the "actual" velocity vector of the article 41. Thus, a positional relationship in which the robot 12 can appropriately perform a work on the article can be maintained more accurately and more securely as compared to controlling based on the velocity vector of the article 41 grasped from the design data or the control data of the production system 1.

FIG. 3 is a flowchart illustrating an operation flow of a production system according to an embodiment of the present disclosure. Here, as an example, the production system 1 in which the robot 12 performs a work of assembling the component 42 to the article 41 conveyed by the conveyance device 11 will be described.

A robot work area in which the robot 12 can perform a work on the article 41 conveyed by the conveyance device 11 is defined by a conveyable range of the article 41 by the conveyance device 11, a movable range of an arm of the robot 12, and a movable range of the main body of the robot 12 by the movement device 13. For example, in the production system 1 in which a plurality of articles 41 are sequentially flowed into the robot work area by the conveyance device 11, when one article 41 enters the robot work area, the robot 12 starts tracking the one article 41 and starts a work on the one article 41. Then, the robot 12 completes the work on the one article 41 before the one article 41 leaves the robot work area. In step S101, the control unit 23 controls the movement device 13 so as to make the main body of the robot 12 stand by at a work start position until the article 41 enters the robot work area.

When the article 41 enters the robot work area, in step S102, the sensor 21 acquires position information of the article 41 conveyed by the conveyance device 11.

In step S103, the calculation unit 22 computes a velocity vector of the article 41 conveyed by the conveyance device 11 based on the position information acquired by the sensor 21 and transmits the velocity vector to the control unit 23 in the first controller 14.

In step S104, the control unit 23 controls a velocity vector of the robot 12 moved by the movement device 13 and a velocity vector of the position of the end effector 31 of the robot 12 so as to make the sum of the velocity vector of the robot 12 moved by the movement device 13 and the velocity vector of the position of the end effector 31 of the robot 12 match the velocity vector of the article 41 conveyed by the conveyance device 11.

In step S104, the first controller 14 determines whether or not the robot 12 has completed the work on the article 41.

When the first controller 14 determines that the robot 12 has not completed the assembling work on the article 41 in step S104, the processing returns to step S102. The processing in steps S102 to S105 is repeatedly executed in a predetermined cycle (for example, in a cycle of several hundred milliseconds). While the processing in steps S102 to S105 is repeatedly executed, the first controller 14 controls the robot 12 so as to perform the work of assembling the component 42 to the article 41. It should be noted that a two-dimensional camera for the assembling work is provided at the vicinity of the end effector 31. The two-dimensional camera images the article 41 at a high frequency (for example, several milliseconds), and an operation necessary for assembling the component 42 to the article 41 is performed while the operation of the end effector 31 relative to the article 41 is controlled with high accuracy by using pattern matching processing based on the imaged image.

When the first controller 14 determines that the robot 12 has not completed the assembling work on the article 41 in step S104, the processing on the article 41 is terminated. Then, the control unit 23 performs control for moving the main body of the robot 12 to the work start position and control for causing the main body of the robot 12 to stand by at the work start position until a new article 41 enters the robot work area (step S101).

It should be noted that when the control unit 23 controls the velocity vector of the robot 12 moved by the movement device 13 and the velocity vector of the position of the end effector 31 of the robot 12, a velocity vector component in the movement direction of the main body of the robot 12 by the movement device 13, i.e., in the X-axis direction, is appropriately created in a shared manner by the velocity vector of the robot 12 and the velocity vector of the position of the end effector 31 of the robot 12. That is, the velocity vector component in the movement direction of the main body of the robot 12 by the movement device 13, i.e., in the X-axis direction may be equally shared by the velocity vector of the robot 12 and the velocity vector of the position of the end effector 31 of the robot 12 or may be shared by the velocity vector of the robot 12 and the velocity vector of the position of the end effector 31 of the robot 12 at any ratio. Some examples of sharing between the velocity vector of the robot 12 and the velocity vector of the position of the end effector 31 of the robot 12 will be described.

According to a first embodiment, the control unit 23 controls the movement direction of the main body of the robot 12 by the movement device 13, i.e., in the X-axis direction so that the movement distance of (the main body of) the robot 12 moved by the movement device 13 is greater than the movement distance of the position of the end effector 31 of the robot 12.

According to a second embodiment, the control unit 23 controls the velocity vector component in the movement direction of the main body of the robot 12 by the movement device 13, i.e., in the X-axis direction so that the speed in the velocity vector of the robot 12 moved by the movement device 13 is higher than the speed in the velocity vector of the position of the end effector 31 of the robot 12.

In the first and the second embodiments, the main body of the robot 12 is moved as much as possible in the X-axis direction by the movement device 13, and the end effector 31 of the robot 12 is moved as little as possible in the X-axis direction. Accordingly, it is possible to avoid a situation in which the arm of the robot 12 reaches a dead limit and exceeds the movable range of the arm of the robot 12. In addition, the robot 12 can perform a work with higher accuracy by reducing a control load for the X-axis direction component of the velocity vector of the end effector 31 of the robot and giving weight to the control of the Y-axis direction component and the Z-axis direction component. In particular, even when the article 41 suddenly moves greatly in the X-axis direction, the influence thereof on an original work of the robot 12 can be reduced by quickly moving the main body of the robot 12 in the X-axis direction with the movement device 13.

According to a third embodiment, the control unit 23 performs control such that the speed in the velocity vector of the position of the end effector 31 of the robot 12 is higher than the speed in the velocity vector of the robot 12 moved by the movement device 13. Typically, the movement device 13 has slower acceleration than the end effector 31 of the robot 12, and thus is inferior in trackability to the article 41 conveyed by the conveyance device 11. For this reason, in the third embodiment, the movement speed of the end effector 31 of the robot 12 is given priority over the movement speed of the robot 12 moved by the movement device 13 in order to quickly track the article 41 conveyed by the conveyance device 11. For example, when the robot 12 does not much time left to perform a work, such as when the article 41 conveyed by the conveyance device 11 approaches an end of the robot work area or when the movement device 13 approaches an end of the movable range for, in accordance with the third embodiment, the speed in the velocity vector of the position of the end effector 31 of the robot 12 is controlled to be higher than the speed in the velocity vector of the robot 12 moved by the movement device 13. Thus, the end effector 31 of the robot 12 is caused to quickly track the article 41 conveyed by the conveyance device 11.

The first embodiment, the second embodiment, and the third embodiment may be appropriately combined and executed or may be selectively switched and executed.

REFERENCE SIGNS LIST

1 Production system
11 Conveyance device
12 Robot
13 Movement device
14 First controller
15 Second controller
21 Sensor
22 Calculation unit
23 Control unit
14 First controller
15 Second controller
31 End effector
41 Article
41A, 41B Fitting portion
42 Component
42A, 42B Fitting portion
100 Velocity vector of article
200 Velocity vector of robot
300 Velocity vector of end effector of robot

The invention claimed is:

1. A production system including a conveyance device configured to convey an article, a robot configured to perform a work on the article conveyed by the conveyance device, a movement device configured to move the robot, the production system comprising:
   a sensor configured to acquire position information of the article conveyed by the conveyance device;
   a calculation unit configured to compute a velocity vector of the article conveyed by the conveyance device based on the position information acquired by the sensor; and
   a control unit configured to, when a movement direction of the article conveyed by the conveyance device is different from a movement direction of the robot moved by the movement device, control a velocity vector of the robot moved by the movement device and a velocity vector of a position of an end effector of the robot so as to make a sum of the velocity vector of the robot moved by the movement device and the velocity vector of the position of the end effector of the robot match the velocity vector of the article conveyed by the conveyance device.

2. The production system according to claim 1, wherein the movement device is configured to cause the robot to reciprocate in one direction.

3. The production system according to claim 1, wherein the control unit is configured to control a movement distance of the robot moved by the movement device to be greater than a movement distance of the position of the end effector of the robot.

4. The production system according to any one of claim 1, wherein the control unit is configured to control a speed in the velocity vector of the robot moved by the movement device to be higher than a speed in the velocity vector of the position of the end effector of the robot.

5. The production system according to any one of claim 1, wherein the control unit is configured to control a speed in the velocity vector of the position of the end effector of the robot to be higher than a speed in the velocity vector of the robot moved by the movement device.

* * * * *